United States Patent [19]

Evans et al.

[11] Patent Number: 5,509,520

[45] Date of Patent: Apr. 23, 1996

[54] ELECTROHYDRAULIC CONTROL DEVICE FOR A DRIVE TRAIN OF A MACHINE

[75] Inventors: William C. Evans, Metamora; Daniel E. Henderson, Washington; Robert A. Herold, Peoria Heights; Noel J. Rytter, Peoria, all of Ill.

[73] Assignee: Caterpillar Inc., Peoria, Ill.

[21] Appl. No.: 260,426

[22] Filed: Jun. 15, 1994

[51] Int. Cl.$^6$ ............................ B60K 41/28; F16H 47/06
[52] U.S. Cl. .................... 192/3.23; 192/3.26; 192/3.3; 192/3.58; 192/4 C; 74/733.1
[58] Field of Search .................... 192/3.21, 3.23, 192/3.26, 3.3, 3.31, 3.33, 3.58, 4 C, 103 F; 74/731.1, 732.1; 477/65, 175

[56] References Cited

U.S. PATENT DOCUMENTS

| | | |
|---|---|---|
| 2,972,906 | 2/1961 | Schroeder . |
| 3,181,667 | 5/1965 | Lohbauer et al. . |
| 3,621,955 | 11/1971 | Black et al. . |
| 3,680,398 | 8/1972 | Schneider et al. . |
| 3,805,640 | 4/1974 | Schneider et al. . |
| 3,820,417 | 6/1974 | Allen et al. . |
| 3,822,771 | 7/1974 | Audiffred et al. . |
| 4,194,608 | 3/1980 | Usui et al. . |
| 4,208,925 | 6/1980 | Miller et al. . |
| 4,386,688 | 6/1983 | Sato et al. . |
| 4,388,987 | 6/1983 | Hennessey et al. . |
| 4,414,863 | 11/1983 | Heino . |
| 4,463,842 | 8/1984 | Redzinski . |
| 4,699,239 | 10/1987 | Ishino et al. . |
| 4,734,861 | 3/1988 | Bertolasi et al. . |
| 4,915,075 | 4/1990 | Brown . |
| 4,961,484 | 10/1990 | Kato et al. . |
| 5,040,648 | 8/1991 | Mitchell et al. . |
| 5,042,314 | 8/1991 | Rytter et al. . |
| 5,380,257 | 1/1995 | Coffman et al. .............. 477/175 |

FOREIGN PATENT DOCUMENTS

| | | |
|---|---|---|
| 0475918 | 3/1992 | European Pat. Off. . |
| 1156658 | 10/1963 | Germany . |
| 4-145254 | 5/1992 | Japan . |

OTHER PUBLICATIONS

Patent Application No. 08/037,136, Filed Mar. 25, 1993, Entitled "Electro–Hydraulic Control Device for a Drive Train of a Vehicle", Michael F. Coffman et al., Docket No. 93-157.

*Primary Examiner*—Richard M. Lorence
*Attorney, Agent, or Firm*—David M. Masterson

[57] ABSTRACT

An electrohydraulic control device for a drive train of a machine is disclosed. The drive train includes an engine, a transmission, and a torque converter having a rotating housing. The torque converter is drivingly connected between the engine and the transmission. The torque converter also includes an impeller element. An impeller clutch connects the impeller element to the rotating housing. An impeller clutch electrohydraulic valve produces fluid flow to the impeller clutch to controllably engage and disengage the impeller clutch. A torque converter speed sensor senses the output speed of the torque converter and responsively produces a torque converter speed signal. A electronic device receives the measured torque converter speed signal, determines a desired torque convertor speed signal, produces an error speed signal in response to a difference between the measured and desired torque converter speed signals, and controllably actuates the electrohydraulic valve to cause the speed error signal to approach zero.

14 Claims, 11 Drawing Sheets

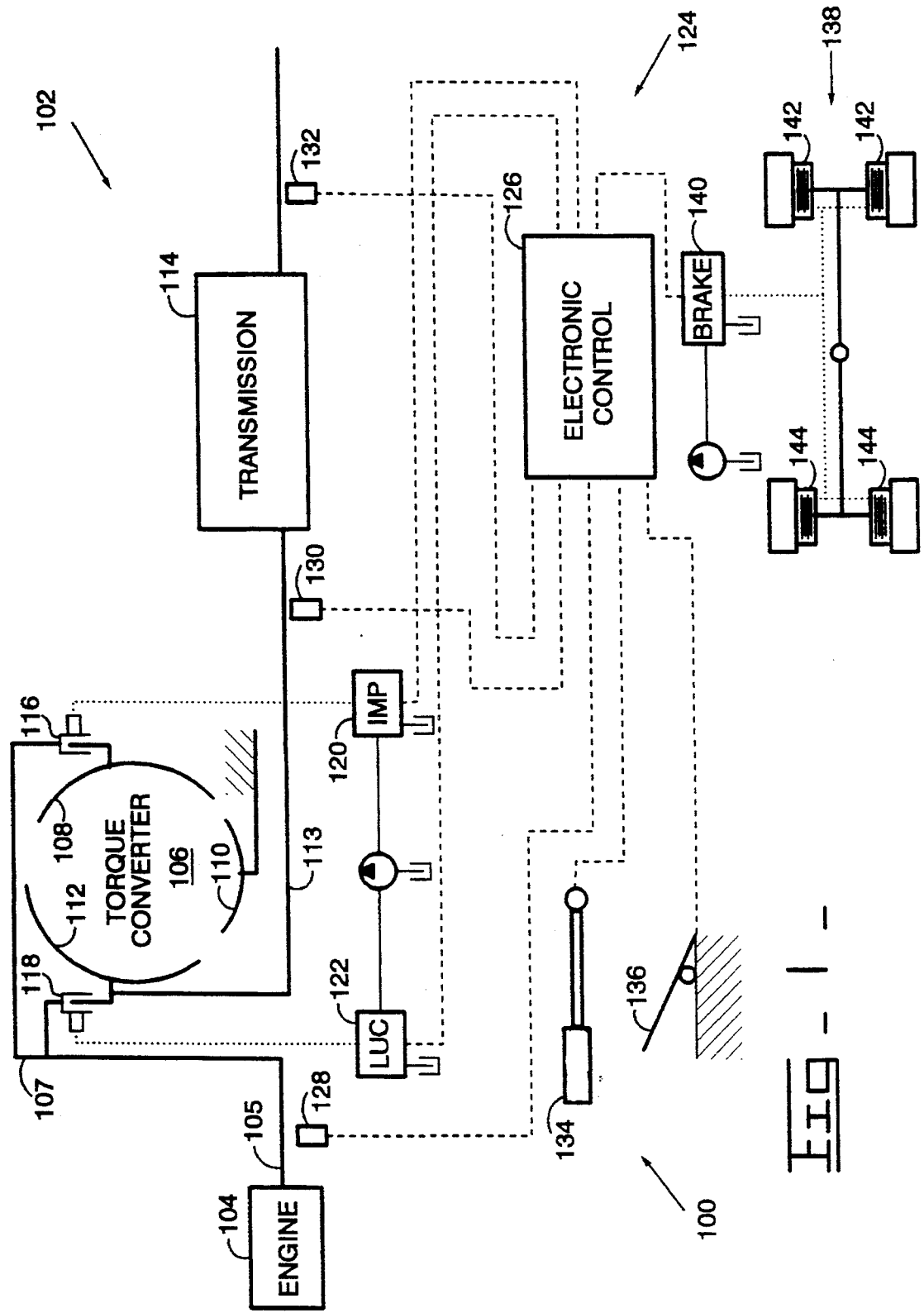

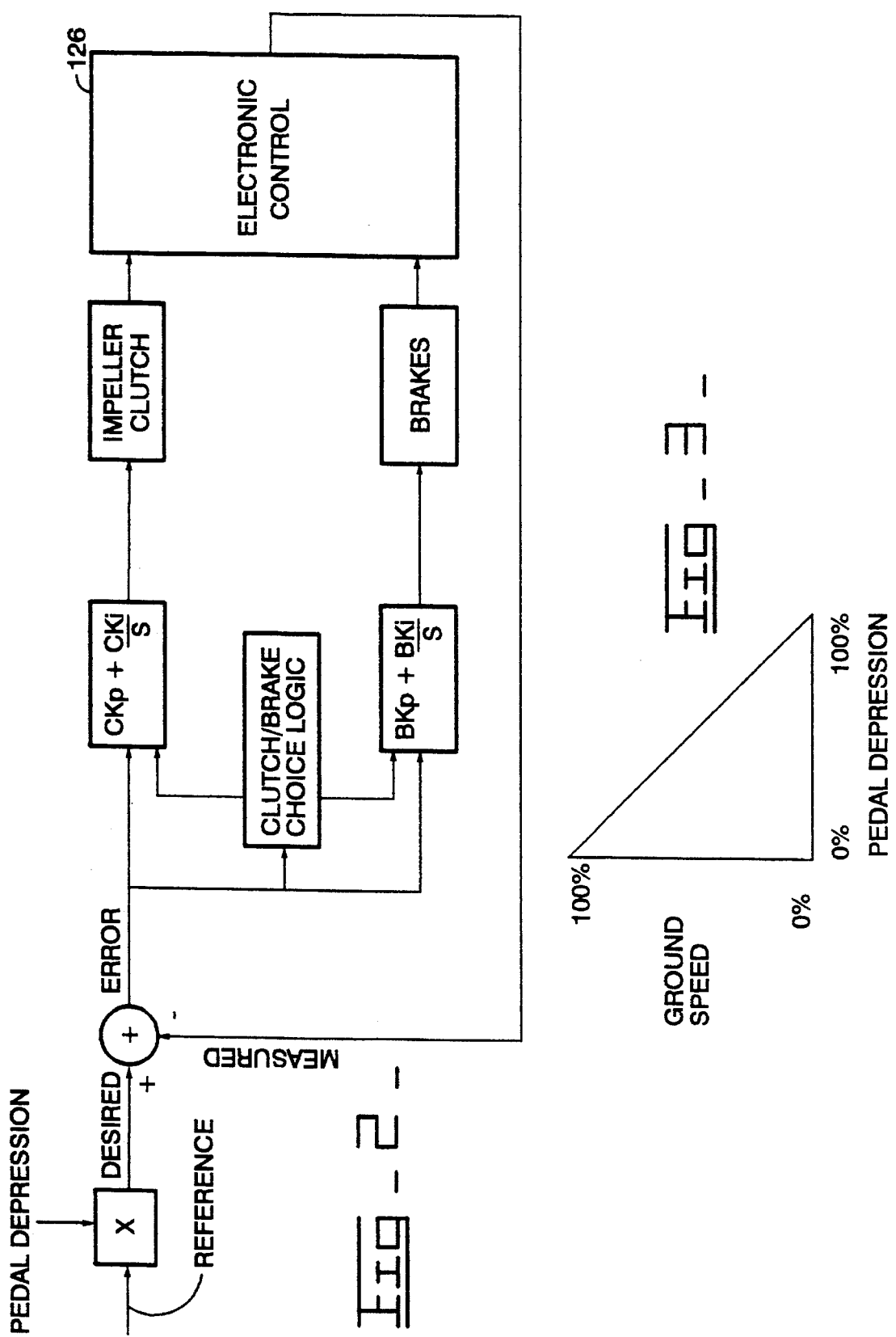

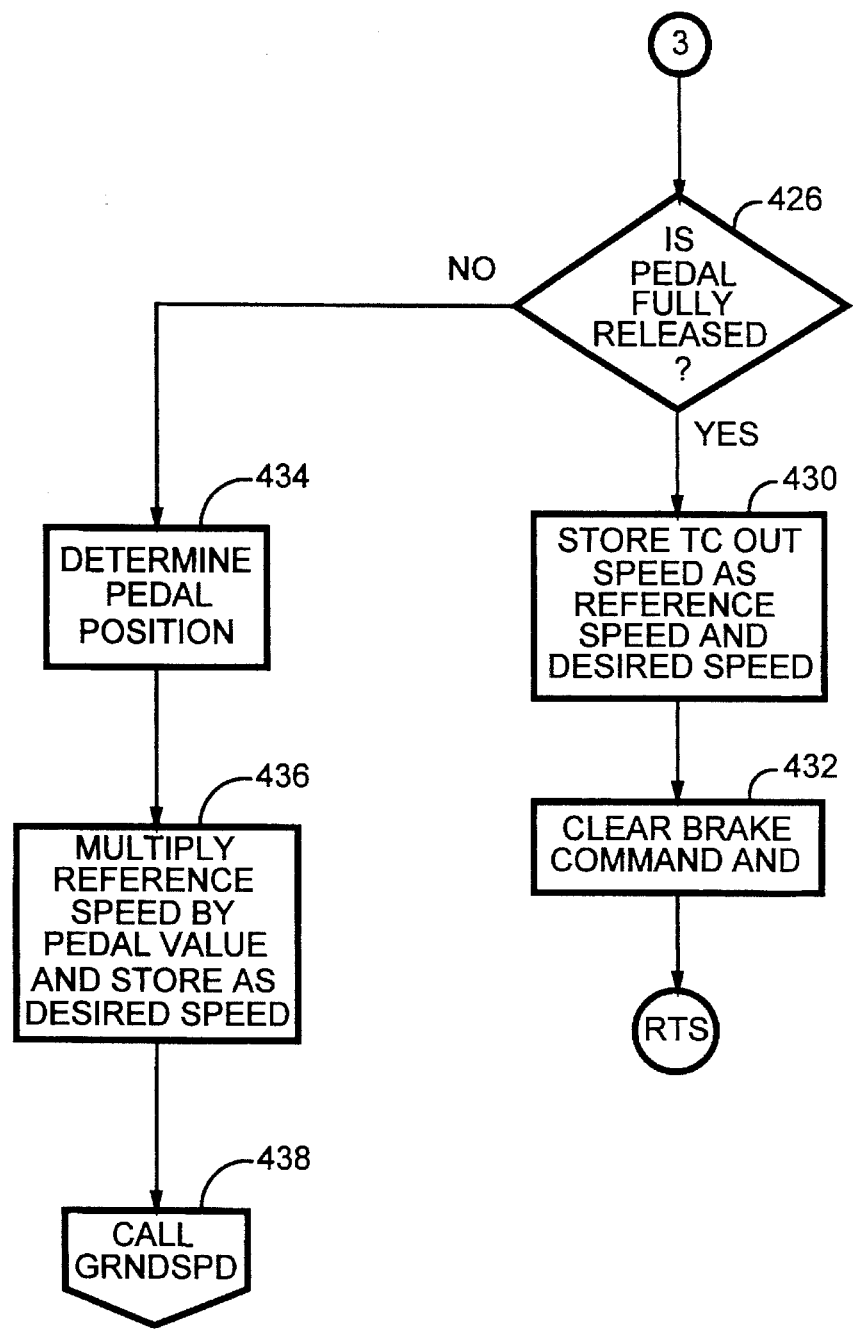
Fig-4B-

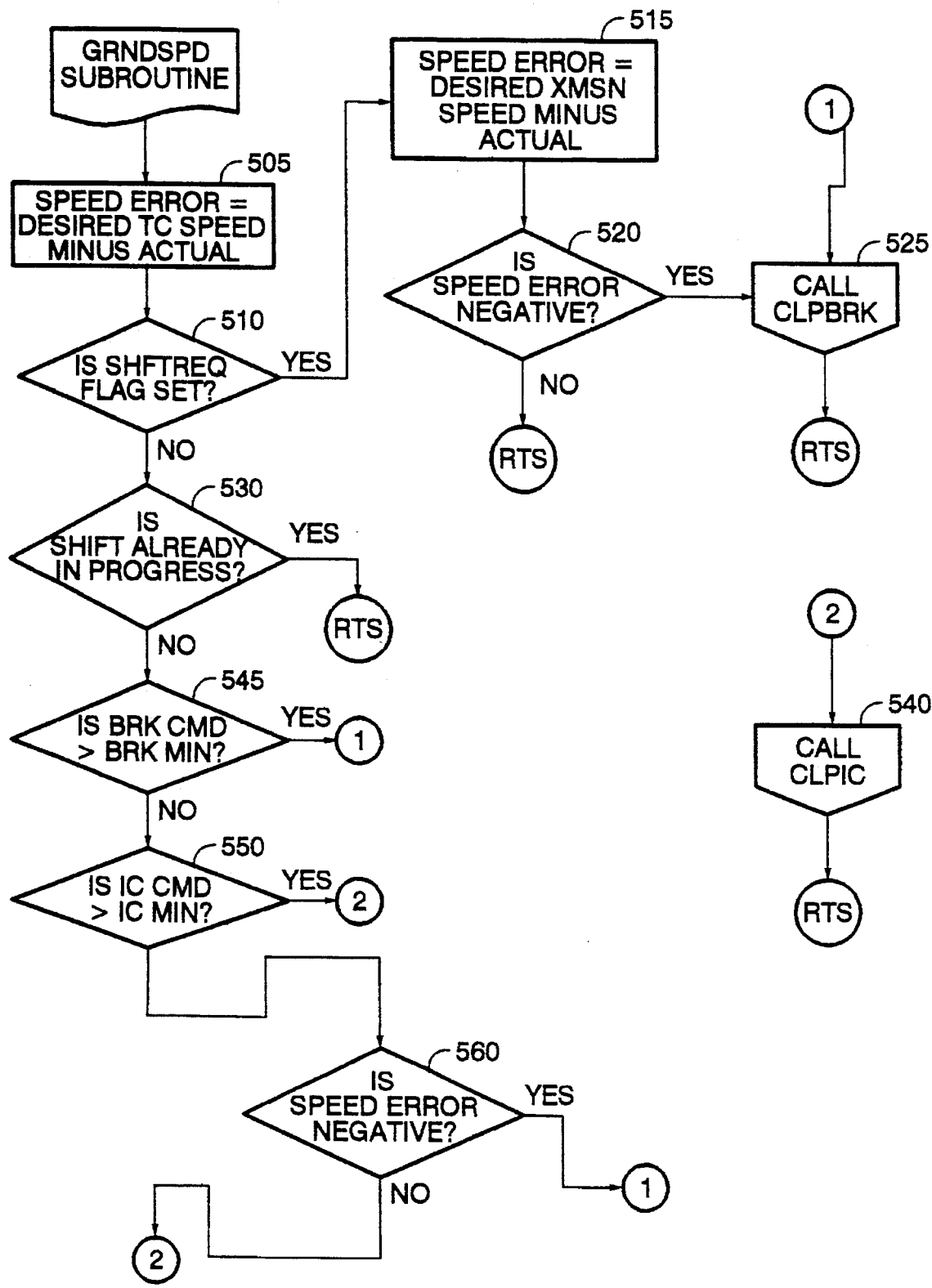
Fig_5_

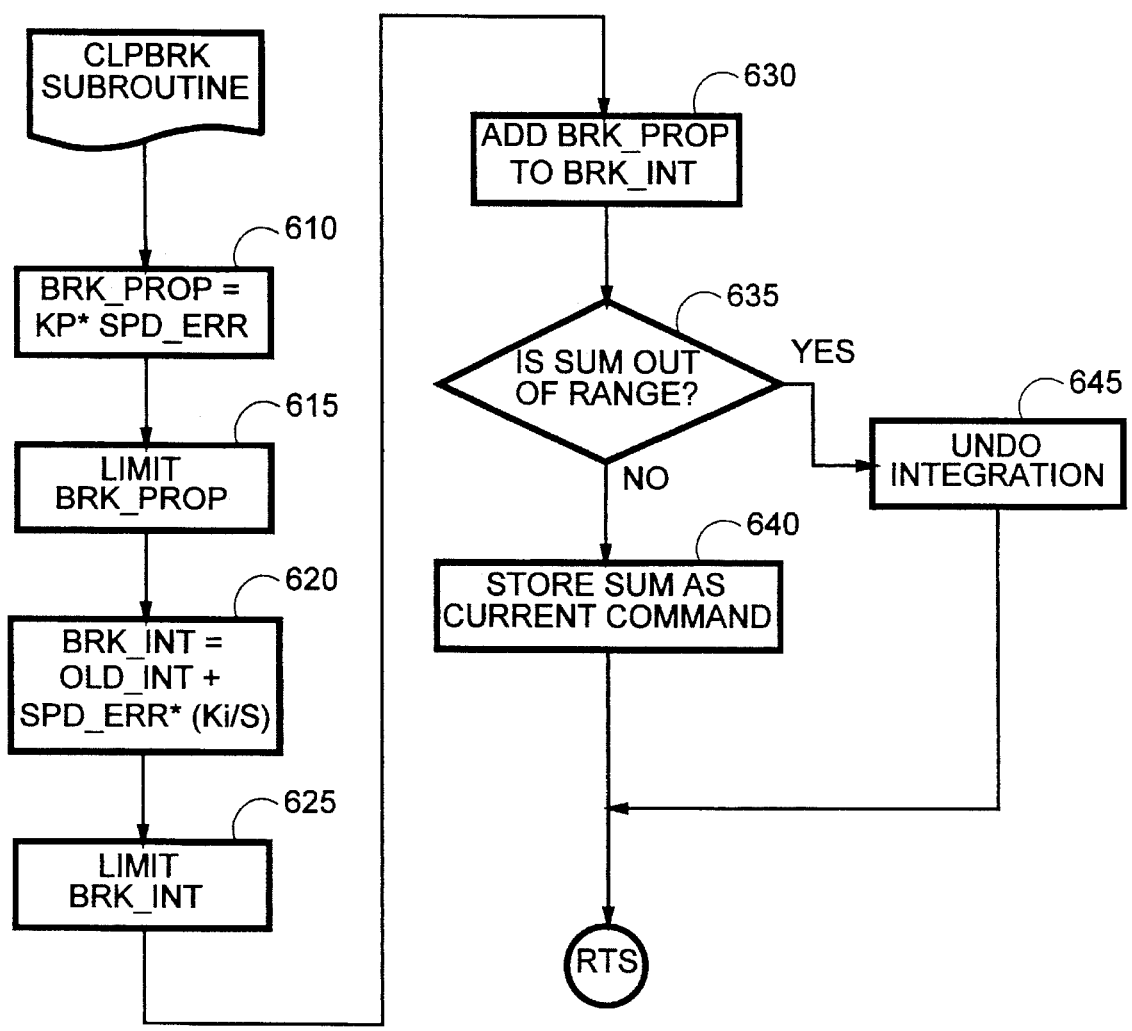
Fig_6_

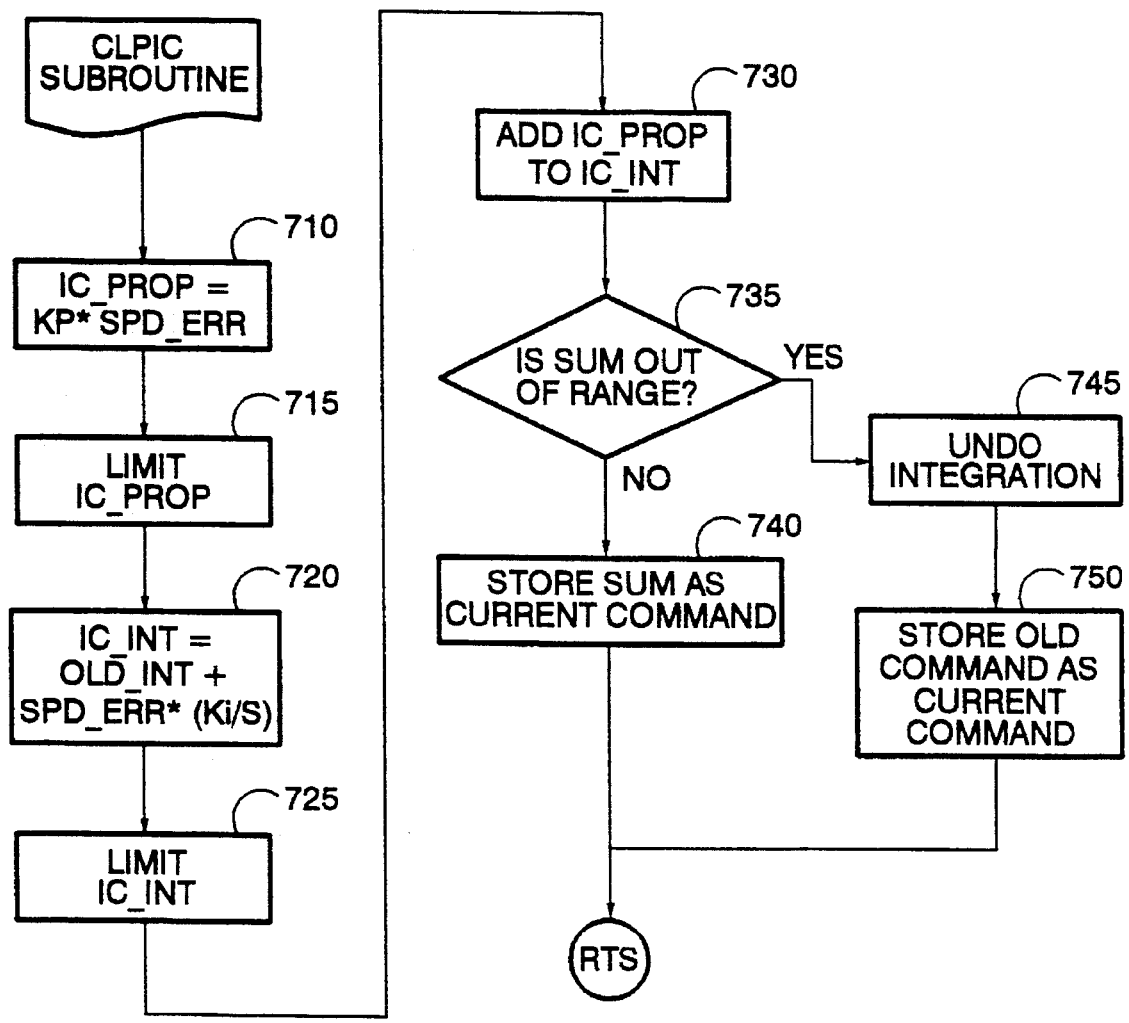
Fig-7-

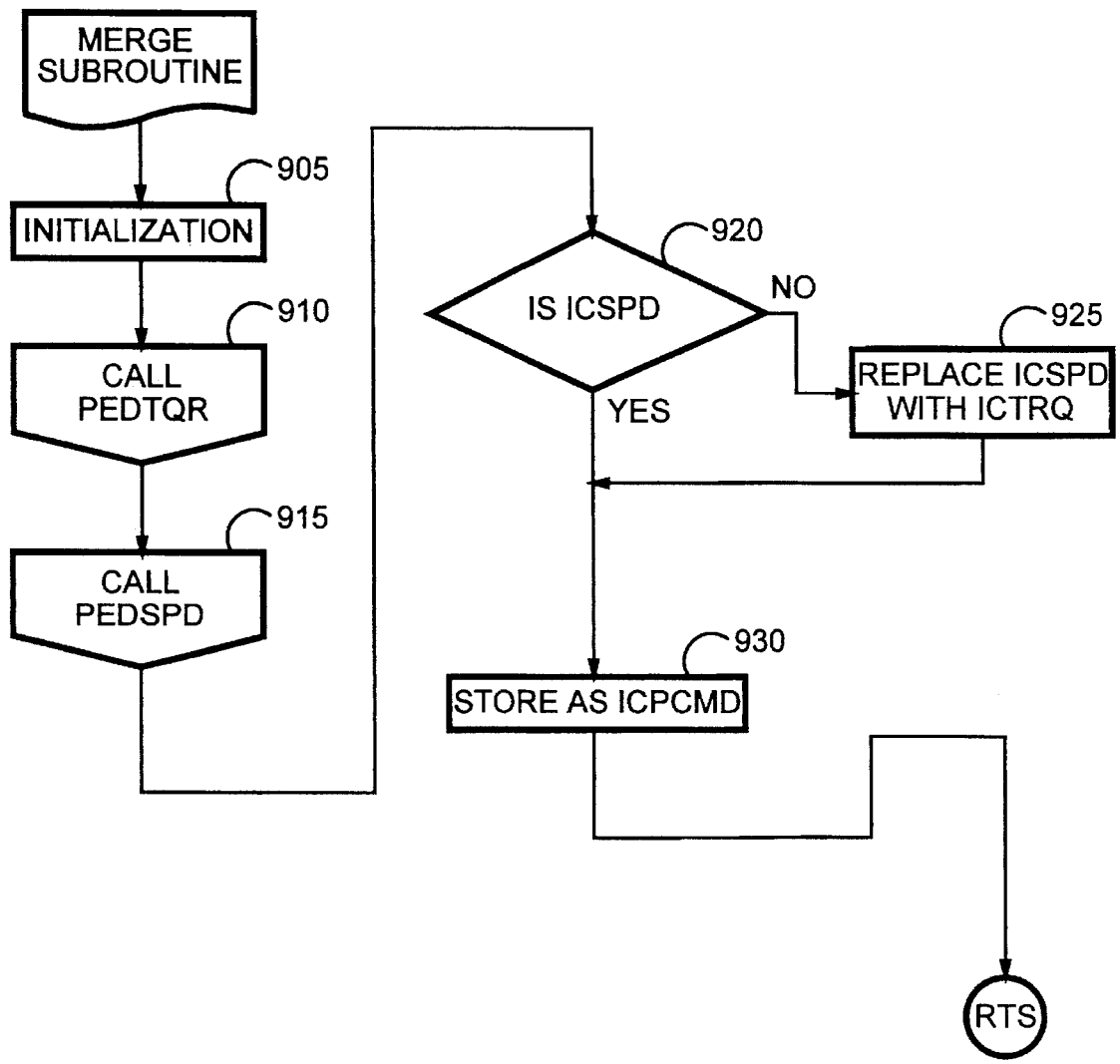
Fig_9_

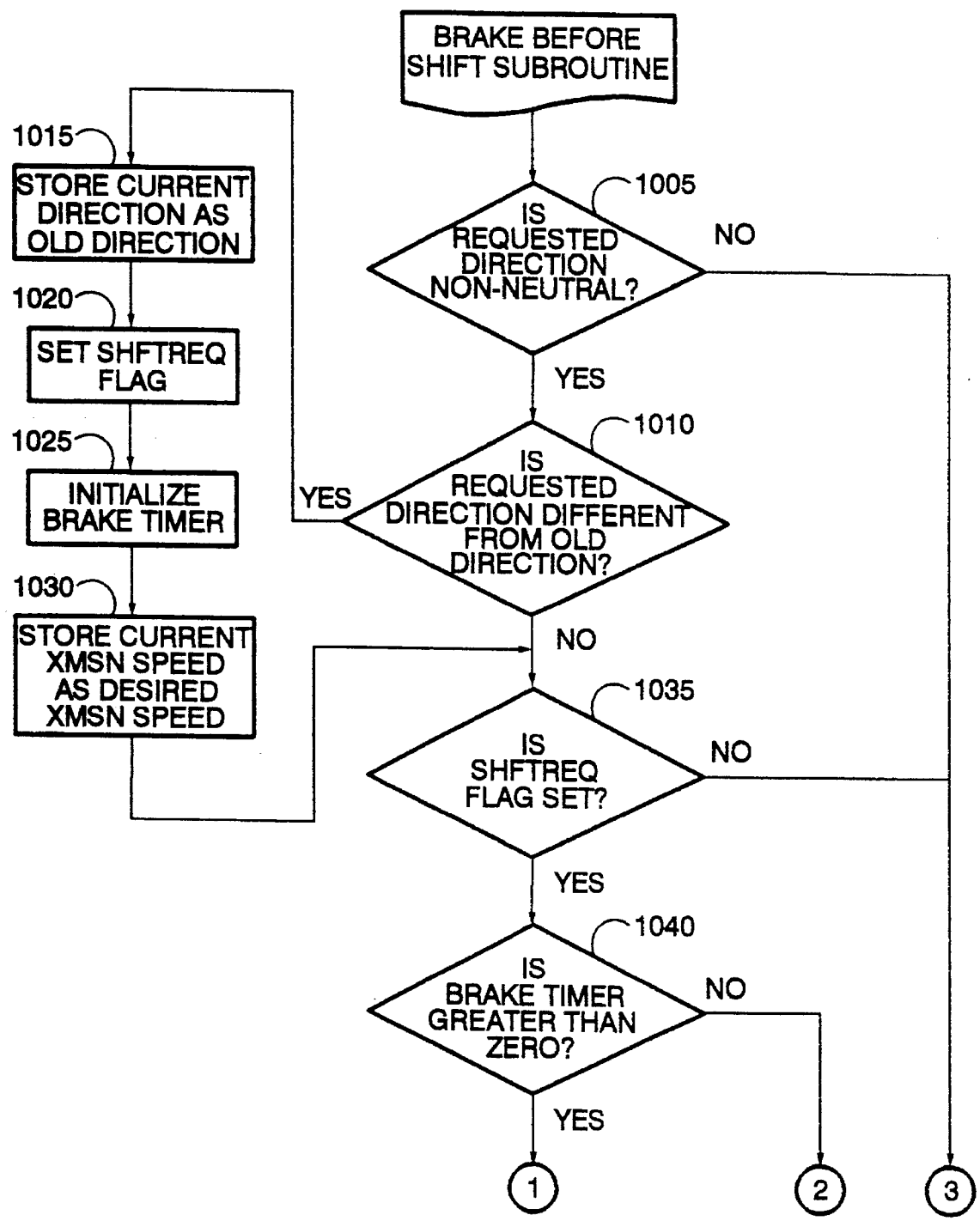
FIG_10A

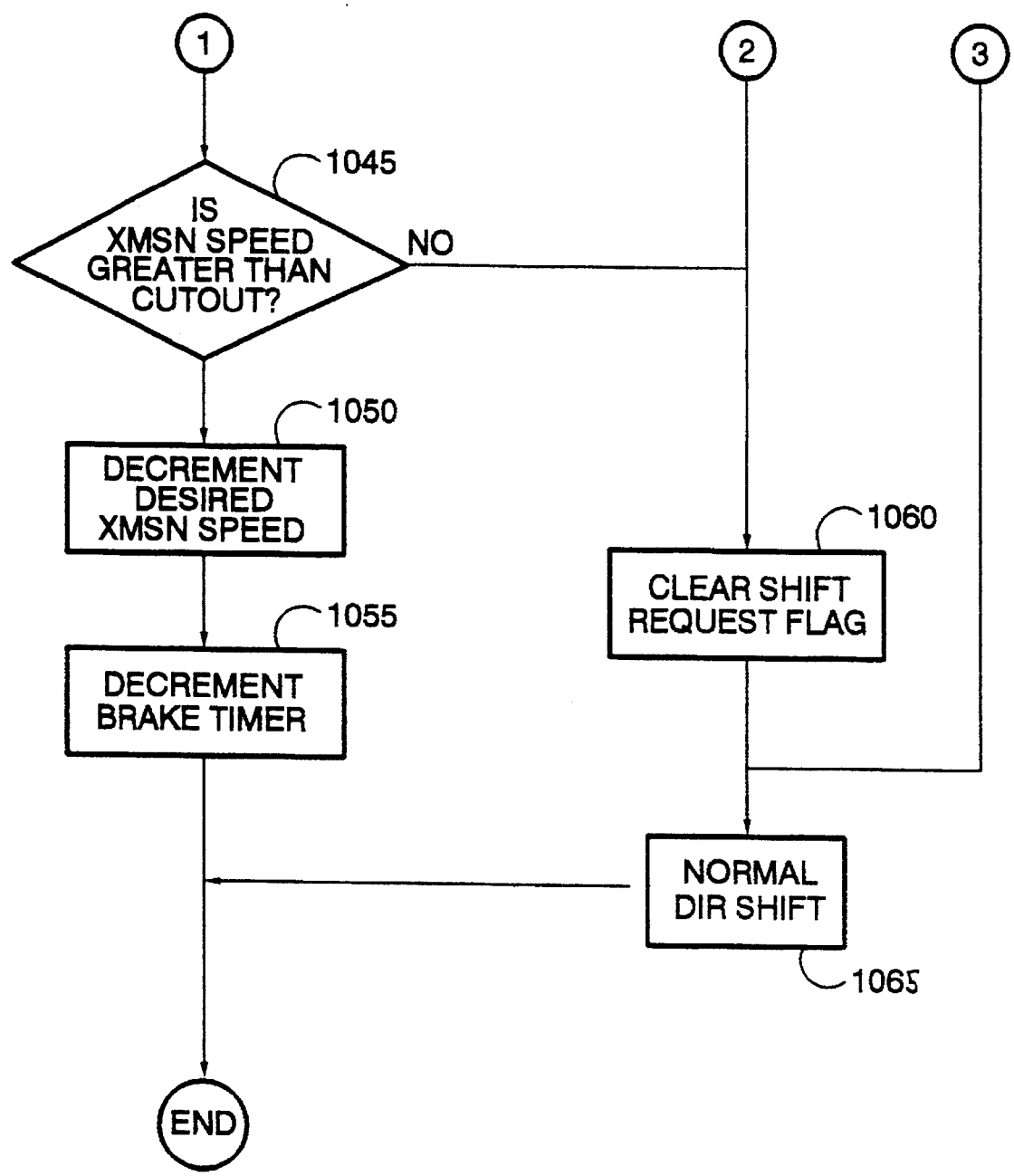
Fig_10B_

ELECTROHYDRAULIC CONTROL DEVICE FOR A DRIVE TRAIN OF A MACHINE

TECHNICAL FIELD

The present invention relates generally to an electrohydraulic control device and method for controllably operating a machine, and more particularly to an electrohydraulic control device having an electronic control module and one or more manually operated actuator mechanisms for affecting certain modes of operation of the drive line of the machine through the electronic control module including the engagement of a torque converter impeller clutch.

BACKGROUND ART

In one conventional mode of "inching" a machine, the transmission is kept in gear and the brakes are manually modulated by use of a foot pedal. This is undesirable because it requires considerable operator effort and because the service brakes experience a relatively rapid rate of wear. In another well known mode, when the machine's service brakes are applied by the depression of a foot pedal, an associated disc and plate type transmission clutch is caused to slip so that the transmission is substantially neutralized. This is most often accomplished by the brake system fluid circuit acting upon an "inching" valve disposed between a pressure source and the clutch, as has been widely used in shuttle-type lift trucks. This is desirable since the machine's ground speed is reduced for more precise control, while the speed of the engine is maintained at a relatively high rate to enable a rapid response of the auxiliary equipment operated by the engine. However, controlled slip at a fixed setting of the manually operated control member in both of these modes of operation has heretofore been impractical.

In another conventional method of providing inching capabilities to a machine, an impeller clutch connected between a machine's engine and transmission is provided. Typically, the impeller clutch is actuated through an operator pedal. The operator pedal acts to engage and disengage the impeller clutch, thereby, varying the power transmitted by the drive train and slowing the machine. However, maintaining the machine at a speed proportional to the operator pedal is difficult due to changes in torque on the drivetrain.

The present invention is directed to overcoming one or more of the problems as set forth above.

DISCLOSURE OF THE INVENTION

In one aspect of the present invention, an electrohydraulic control device for a drive train of a machine is disclosed. The drive train includes an engine, a transmission, and a torque converter having a rotating housing. The torque converter is drivingly connected between the engine and the transmission. The torque converter also includes an impeller element. An impeller clutch connects the impeller element to the rotating housing. An impeller clutch electrohydraulic valve produces fluid flow to the impeller clutch to controllably engage and disengage the impeller clutch. A torque converter speed sensor senses the output speed of the torque converter and responsively produces a torque converter speed signal. A electronic device receives the measured torque converter speed signal, determines a desired torque convertor speed signal, produces an error speed signal in response to a difference between the measured and desired torque converter speed signals, and controllably actuates the electrohydraulic valve to cause the speed error signal to approach zero.

BRIEF DESCRIPTION OF THE DRAWINGS

For a better understanding of the present invention, reference may be made to the accompanying drawings in which:

FIG. 1 shows a block diagram of an electrohydraulic drive system for a machine;

FIG. 2 shows a block diagram of a closed-loop feedback control associated with a ground speed control subroutine.

FIG. 3 shows a graph illustrating the machine ground speed versus an impeller clutch pedal position;

FIGS. 4A–B show a plurality of flowcharts of the program control associated with a subroutine that examines several operating conditions prior to the ground speed control subroutine being enabled;

FIG. 5 shows a flowchart of the program control associated with the ground speed control subroutine;

FIGS. 6 and 7 are flowcharts of the program control associated with a Proportional-Integral control strategy of a braking and impeller clutch subroutines;

FIG. 9 shows a flowchart of the program control associated with a merge subroutine; and FIGS. 10A,B show a plurality of flowcharts of the program control associated with a brake-before-shift subroutine.

BEST MODE FOR CARRYING OUT THE INVENTION

Figure 4A:
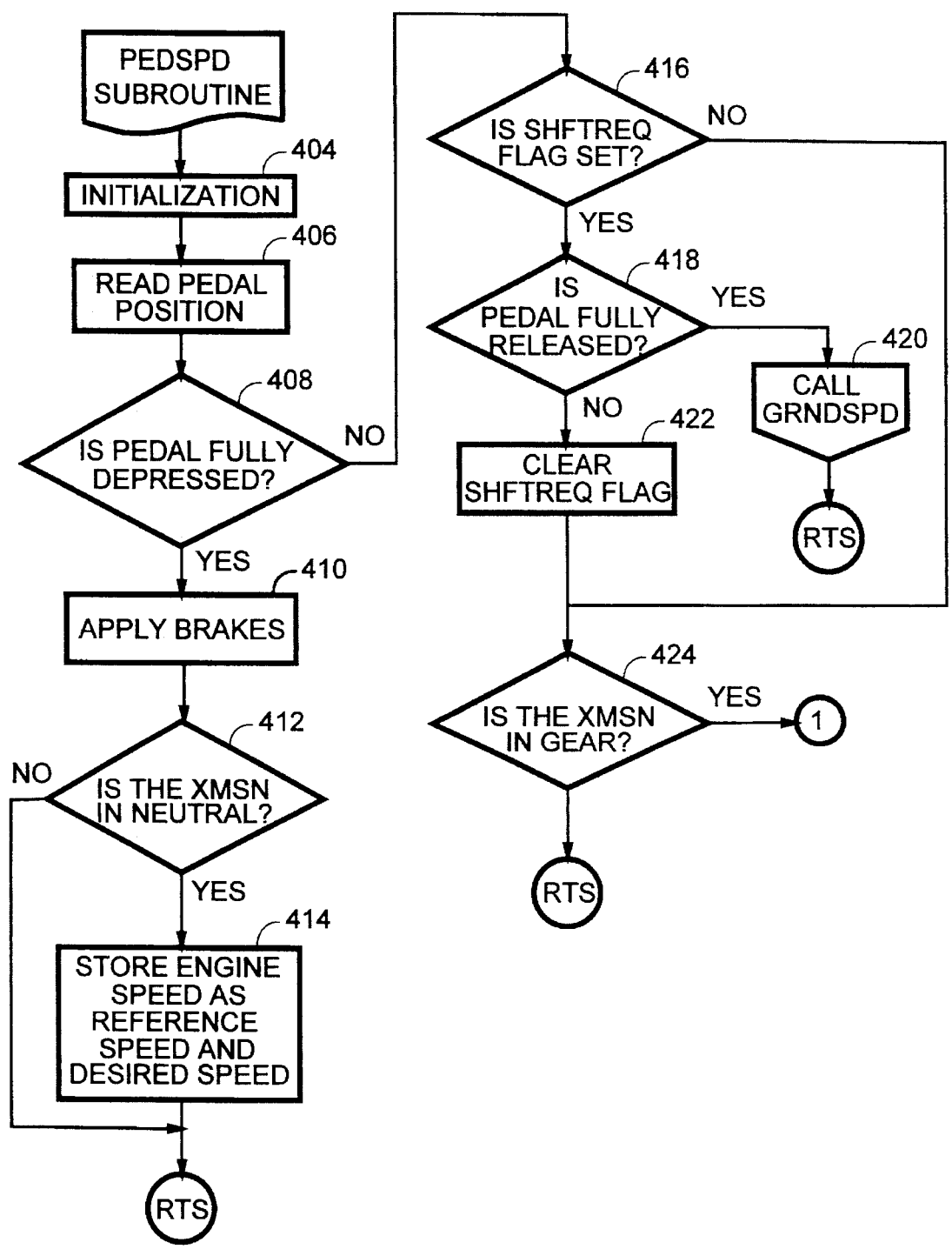

The present invention is directed toward controlling the ground speed of an earth working machine 100, such as a wheel loader. A drive train 102 for the machine is illustrated in FIG. 1. The drive train includes an engine 104 having a shaft 105 connected to a hydrodynamic torque converter 106. The torque converter includes, rotating housing 107, an impeller element 108, a reactor element 110, and a turbine element 112 connected to a centrally located output shaft 113. The output shaft provides the input to a multispeed transmission 114 that preferably has a plurality of interconnected planetary gear sets selectively engaged in cooperating groupings by operation of a pair of disc-type directional clutches or brakes and a plurality of disc-type speed clutches or brakes.

The drive train also includes a disc-type input clutch or impeller clutch 116 located between the engine 104 and the torque converter 106 for controllably coupling the rotating housing to the impeller element, and a disc-type lockup clutch 118 for selectively coupling the rotating housing to the turbine element and the output shaft for a direct mechanical connection that effectively bypasses the torque converter. An electrohydraulic impeller clutch valve 120 provides fluid flow to actuate the impeller clutch, while an electrohydraulic lockup clutch valve 122 provides fluid flow to actuate the lockup clutch.

An electrohydraulic control device 124 is provided to control the operation of the drive train. The control device includes an electronic control module 126 containing an internal microprocessor. The term microprocessor is meant to include microcomputers, microprocessors, integrated circuits and the like capable of being programmed. The electronic control module contains sufficient electronic circuitry to convert input signals from a plurality of sensors and switches to a form readable by the microprocessor, and circuitry to generate sufficient power to drive a plurality of solenoids for actuating the transmission 114, the impeller clutch 116, and the lockup clutch 118 according to signals produced by the control module. The microprocessor is programmed with preselected logic rules for receiving one or more manually selected operating signals and a plurality of automatically generated operating signals.

The electronic control module automatically receives three control signals pertaining to the operation of the drive train. An engine speed sensor 128 is mounted on a stationary portion of the drive train for providing a signal proportional to the rotational speed of the engine shaft. A torque converter speed sensor 130 produces a signal corresponding to the rotational speed and direction of the torque converter output shaft. Finally, a transmission speed sensor 132 produces a signal corresponding to the rotational speed and direction of the transmission output shaft.

The electrohydraulic control device 124 includes an operator control handle 134 for selectively controlling the operation of the transmission. The control handle generates transmission control signals to the control module indicative of a desired gear ratio and/or direction of the machine. An operator impeller pedal 136 is provided for selectively controlling the degree of engagement of the impeller clutch. The impeller pedal is rockable about a transversely oriented pivot pin. As the pedal is depressed from an elevated position to an intermediate position the ability of the impeller clutch 116 to transmit torque to the impeller element 108 from the engine is proportionately reduced. When depressed, the impeller pedal generates an impeller control signal to the electronic control module proportional to the pedal position. Braking of the machine may be also be initiated through a service brake mechanism 138 in response to the impeller pedal being depressed. An electrohydraulic brake valve 140 provides fluid flow to actuate the front and rear sets of brakes 142,144.

It is noted that the service brake mechanism includes a brake pedal (not shown) for manually operating the front and/or rear brake sets. Moreover an accelerator pedal (not shown) is provided to manually control the speed of the engine.

The present invention employs a closed-loop drivetrain speed control system using the impeller pedal as one input and the impeller clutch and machine brakes as the control actuators. Referring now to FIG. 2, a block diagram of the drivetrain speed control is shown and is discussed below.

When the impeller pedal is not depressed, the impeller clutch is fully engaged to transfer the fully amount of torque from the engine to the transmission, and the brakes are fully disengaged. Thus, the electronic control only modifies the machine ground speed in response to the control pedal being depressed.

Once the impeller pedal is depressed, the torque converter speed is sampled and utilized as the reference torque converter speed. The reference torque converter speed is then scaled in proportion to the impeller pedal angle to provide a desired torque converter speed. Thus, as the angle of depression of the impeller pedal increases, the desired torque converter speed proportionally decreases. For example, an angle of depression at 10% of the full range will result in a desired speed having a value of 90% of the reference speed. The effect of the control is to actuate the impeller clutch and brakes to force the torque converter output speed to track the desired torque converter speed. It is noted that the torque converter speed correlates to the ground speed of the machine. Accordingly, the ground speed of the machine is controlled in proportion to the angle of depression of the impeller pedal, as shown in FIG. 3.

Once the desired torque converter speed is determined, a torque converter speed error is determined by subtracting the measure torque converter speed from the desired speed. A speed error signal is delivered to a choice logic means. In response to the value of the speed signal, the choice logic determines whether the impeller clutch or brakes are to be controlled. For example, if the value of the speed error is positive (the actual speed is less than the desired speed) or zero, then the impeller clutch is controlled to speed-up the machine. However, if the value of the speed error is negative, then the brakes are controlled to slow-down the machine.

FIGS. 4–7, 9,10 are flowcharts representative of computer program instructions executed by the computer-based control unit of FIG. 1 for carrying out the shift control technique of the present invention. In the description of the flowcharts, the functional explanation marked with numerals in angle brackets, <nnn>, refers to blocks bearing that number. Also, in the following discussion, the acronym "RTS" represents that the program control of the current subroutine returns to the subroutine which called the current subroutine.

FIGS. 4A–B represents the software control PEDSPD, a subroutine that reads several conditions and determines whether the ground speed control should be enabled. First, the software control performs a series of initialization steps such as: storing the torque converter speed as the reference and desired speed, and initializing several software counters and flags <404>. Next the control reads the impeller pedal position <406> and determines if the pedal is fully depressed <408>. If the pedal is fully depressed, then the control causes the brakes to be applied to stop the machine <410>. The control then determines if the transmission is in neutral <412> and stores the engine speed as the reference and desired speed <414>. Note that, the control reads the engine speed rather than the torque converter output speed because the torque converter output speed is zero when the machine is stopped.

However, if the pedal is not fully depressed, then the control determines if a SHFTREQ flag is set <416>, which represents that the operator is requesting a directional shift. If the SHFTREQ flag is set, the control determines whether the impeller pedal is fully released <418>. If the pedal is fully released, then the program control calls a GRNDSPD subroutine <420>, which will be discussed later. If the impeller left pedal is not fully released, then the SHFTREQ flag is cleared <422>.

The program control then determines whether the transmission is in gear <424>. If the transmission is in gear, then the control determines whether the impeller pedal is fully released <426>. If so, then the torque converter speed is stored as the reference speed and desired speed <430>. The control then clears the brake command <432>.

If, at block 426, the control determines that the impeller pedal is not fully released, then the control determines the impeller pedal position <434>, multiplies the reference torque converter speed by a value representing the pedal position and stores the desired torque converter speed <436>. Finally, the control calls the GRNDSPD subroutine <438>.

FIG. 5 represents the software control of the GRNDSPD subroutine. The GRNDSPD subroutine determines whether the machine should "speed-up" or "slow-down", and calls the appropriate subroutine to accomplish this. First the program control determines the speed error <505>, which is defined as the desired torque converter speed minus the actual torque converter speed. The control then determines whether the SHFTREQ flag is set <510>, which represents that the operator is requesting a directional shift.

If the transmission is to perform a directional shift, then it is desirable to slow the ground speed of the machine to result in a smooth shift. Because the transmission may be in neutral, the control then determines a new speed error <515>, which is defined as the desired transmission speed minus the actual transmission speed. If the speed error has a negative value <520>, then the program control calls a CLPBRK subroutine to slow the machine via the service brakes <525>. The CLPBRK subroutine is discussed later. Note, if the transmission is in neutral, the torque converter output speed does not correlate to ground speed. Thus, the transmission output speed is substituted for the torque converter output speed.

Returning back to block 510, if a shift is not to begin, i.e., the SHFTREQ is not set, then the control determines if a shift is already in progress <530>. If a shift is in progress, then the program control returns to the subroutine that called the current subroutine.

However, if a shift is not is progress, then the control determines whether the brake command, which is produced by the CLPBRK subroutine, is greater than a brake command minimum value <545>. If so, then the control calls the CLPBRK subroutine.

Otherwise, the control determines whether the impeller clutch command, which is produced by the CLPIC subroutine, is greater than an impeller clutch minimum value <550>. If so, then the control calls the CLPIC subroutine. Note that, blocks 545 and 550 insure that the commands produced by the CLPBRK or CLPIC subroutines do not occur simultaneously.

Finally, the control determines whether the speed error is negative <560>. If the speed error is negative, then the control calls the CLPBRK subroutine; if the speed error is not negative, then the control calls the CLPIC subroutine.

Referring now to FIG. 6, the program control of the CLBRK subroutine is now described. The CLBRK subroutine utilizes a Proportional Integral (PI) control to produce a brake command signal to slow the machine. First, the control determines the PI terms <610>. The control determines the braking proportional term by multiplying a proportional constant, Kp, by the speed error. Then the control compares the braking proportional term to maximum and minimum proportional values and limits the braking proportional term, if necessary <615>. The control then determines the new braking integrator term by dividing an integrating constant, Ki, by the sampling frequency, S, and then multiplying the product by the speed error <620>. Note, that the old integrating term is added to the newly determined integrating term to provide for an accumulated result. The braking integral term is then compared to the maximum and minimum proportional values and limited, if necessary <625>. The terms are then combined <630> and determined if to be within a predetermined range <635>. If the terms are within the range, then the combined term is stored as the braking command <640>. However, if the combined term is out of range, then the integration is undone <645>, e.g., the current combined term is purged and the old braking command is stored as the new braking command.

FIG. 7. illustrates the program control of the CLPIC subroutine. The CLBRK subroutine utilizes a Proportional Integral (PI) control to produce a impeller clutch command signal to speed-up the machine. Note the blocks of FIG. 7 perform similar functions as that of FIG. 6 and will not be further described.

Figure 8:
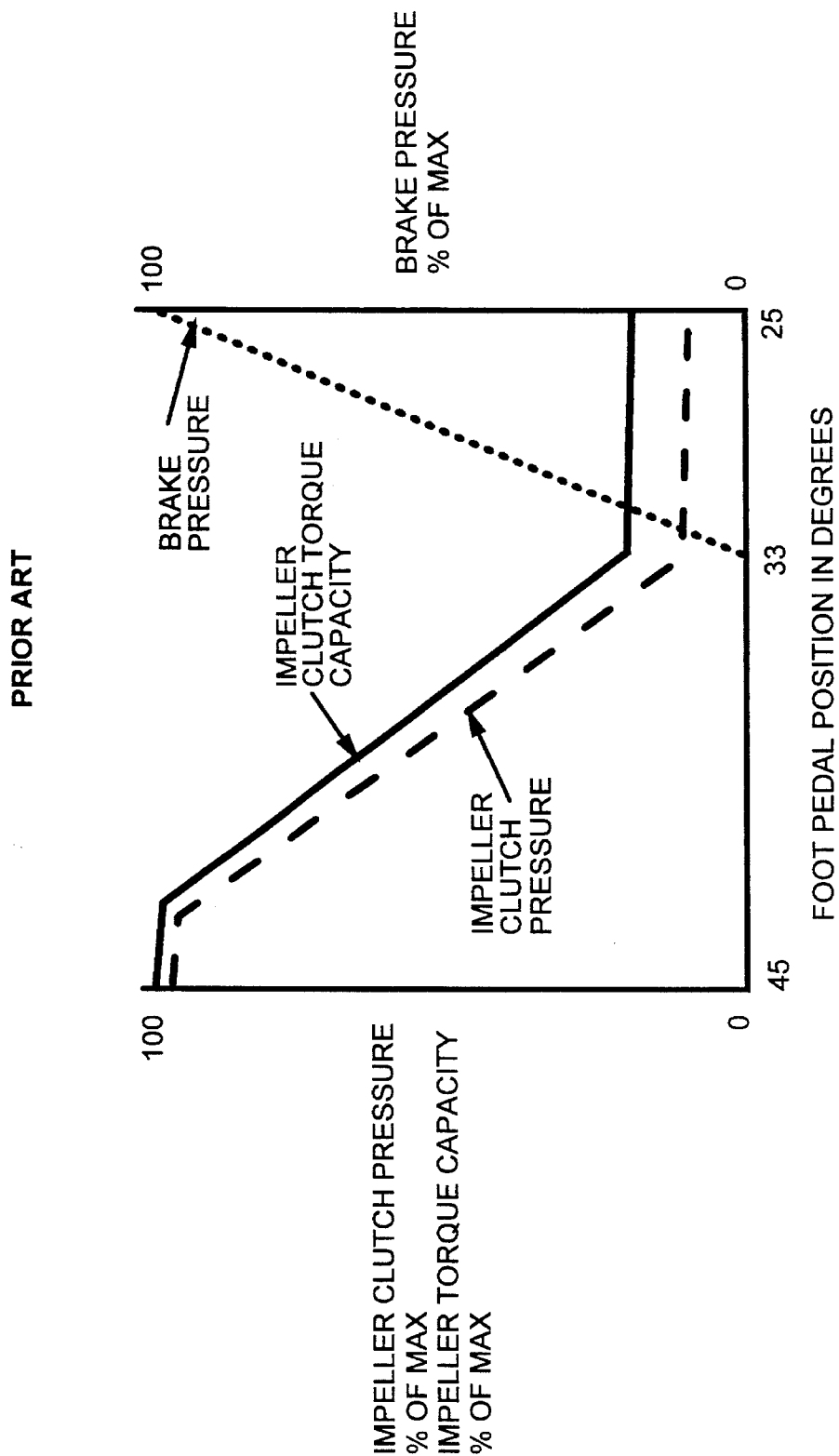
FIG. 8 shows a graph illustrating the impeller clutch and brake pressure versus the impeller clutch pedal position.

In another embodiment of the present invention, the program control "merges" a well known open-loop torque control with the closed-loop speed control described herein. For example, it is well known to modulate the impeller clutch in response to the depression of the impeller pedal. Further it is also well known to modulate the service brakes in response to the impeller clutch position. For example, reference is now made to the graph shown in FIG. 8 which illustrates the impeller clutch torque as a percentage of maximum, and the brake pressure as a percentage of maximum; both as a function of the impeller pedal depression. For example, as the pedal is depressed from a fully elevated 45° first position to an intermediate 35° second position, the electronic control module adjusts the impeller clutch pressure proportionally. Further depression of the pedal causes it to be positioned beyond a 33° second position, progressively directing the actuation of the service brakes. Thus, this prior control has a predetermined amount of overlap between the impeller clutch and brake actuation to control the driveline torque. One such system is disclosed in U.S. Pat. No. 5,040,648 issued to Mitchell et al. on Aug. 20, 1991, which is hereby incorporated by reference. For this discussion, the system of Mitchell et al. is referenced by a subroutine called PEDTQR.

The MERGE subroutine is now described with reference to FIG. 9. The program control first initializes the variables and commands <905>, e.g., the program control causes the impeller clutch to be fully engaged, the service brakes to be fully released, and all integrator states to be cleared. Next the control calls the PEDTQR subroutine and returns a ICTRQ command <910>, and calls the PEDSPD subroutine and returns the ICSPD command <915>. Then the control returns the lower value of the two commands. Accordingly, the control compares the value of the ICTQR and ICSPD commands <920> and replaces the final command with the lessor of the two values <925>. Finally, the final command, ICPCMD is stored with the lessor value <930>. Advantageously this allows the control to have greater control over the machine under various driveline loading conditions. For example, the MERGE subroutine provides for a speed control under light and normal driveline loading, and a torque control under heavy driveline loading. Thus, under heavy driveline loading, e.g., while the machine crowding a pile to load the bucket, the control can reduce wheel slip by using the lower of the two commands.

Yet another embodiment is shown with reference to FIGS. 10A,B, which illustrates the software control of a Brake-Before-Shift subroutine. The Brake-Before-Shift subroutine decelerates the machine before execution of a directional shift to result in relatively smooth shifting. First, the control determines if the requested direction is non-neutral <1005>. If, for example, the requested direction is a neutral shift, then normal shifting occurs <1065>. Otherwise, the control determines whether the requested direction is a shift different from the old direction. If so, then the control stores the current direction as the old direction <1015>, sets the SHFTREQ flag <1020>, initializes the brake timer <1025>, and stores the current transmission speed as the desired transmission speed <1030>.

Eventually control proceeds to block 1035 to determine whether the SHFTREQ flag has been set. If not, then normal shifting occurs. Otherwise, the control determines whether the brake timer is not greater than zero <1040>. If the brake timer is not greater than zero, then the SHFTREQ flag is cleared <1060>. Otherwise, the control determines whether the transmission speed is greater than a cutout value <1045>. For example, if the transmission speed is at a low enough value, then the machine speed is considered to be slow enough not to brake to result in a smooth shift. However, if the transmission is greater than cutout, then the desired transmission speed <1050> and brake timer <1055> are decremented. By decrementing the desired transmission speed, a negative speed error will result providing for the PEDSPD to actuate the brakes to slow the machine.

Industrial Applicability

With respect to the drawings and in operation, the present invention provides for a ground speed control of a machine while the engine is running at high idle. This allows the operator to "inch" the machine while providing full power to the implement hydraulics. More specifically, the electrohydraulic control device controllably actuates the impeller clutch and service brakes to control the ground speed to predetermined value in response to the impeller clutch pedal position. Because the electrohydraulic control device closes the loop on torque converter output speed, the device can control the machine speed to predetermined values even as changes in the torque on the drive train occur.

Moreover, the electrohydraulic control device slows the machine speed prior to a directional shift to result in smooth shifts.

Finally, the electrohydraulic control device selectively uses either open-loop torque control or closed-loop speed control to modify machine performance depending on torque effects on the driveline.

Other aspects, objects and advantages of the present invention can be obtained from a study of the drawings, the disclosure and the appended claims.

We claim:

1. An electrohydraulic control device for a drive train of a machine including an engine, a transmission, a torque converter having a rotating housing and an impeller element, and an impeller clutch for connecting the impeller element to the rotating housing, wherein torque converter is drivingly connected between the engine and the transmission; comprising:

an impeller clutch electrohydraulic valve for producing fluid flow to the impeller clutch to controllably engage and disengage the impeller clutch;

a torque converter speed sensor for sensing the output speed of the torque converter and responsively producing a torque converter speed signal; and control means for receiving the measured torque converter speed signal, determining a desired torque convertor speed signal, producing an error speed signal in response to a difference between the measured and desired torque converter speed signals, and controllably actuating the electrohydraulic valve to cause the speed error signal to approach zero.

2. An electrohydraulic control device, as set forth in claim 1, wherein the machine includes a set of brakes and a braking electrohydraulic valve for producing fluid flow to the brake set to controllably engage and disengage the brake set, whereby the control means selectively controls one of the impeller clutch and braking electrohydraulic valve to cause the speed error signal to approach zero.

3. An electrohydraulic control device, as set forth in claim 2, including an impeller pedal being moveable between a minimum and maximum position for producing an operator impeller signal indicative of the position of the impeller pedal.

4. An electrohydraulic control device, as set forth in claim 3, wherein the control means receives the operator impeller signal and delivers an impeller clutch command signal to the impeller clutch electrohydraulic valve to controllably actuate the electrohydraulic valve solely in response the position of the impeller pedal.

5. An electrohydraulic control device, as set forth in claim 4, wherein the control means receives the operator impeller signal, modifies the measured torque converter signal in response to the operator impeller signal, produces a desired torque converter speed signal in response to the modified measured torque signal, and delivers an impeller clutch command signal to the impeller clutch electrohydraulic valve to controllably actuate the electrohydraulic valve in response the desired torque converter speed signal.

6. An electrohydraulic control device, as set forth in claim 5, wherein the control means includes means for determining the magnitude of an impeller clutch command signal associated with the position of the impeller pedal and an impeller clutch command signal associated with the desired torque converter speed signal, and controllably actuating the electrohydraulic valve in response to the impeller clutch command signal having the lower magnitude.

7. An electrohydraulic control device, as set forth in claim 2, wherein the control means controls the impeller clutch and braking electrohydraulic valves using a Proportional-Integral control strategy.

8. An electrohydraulic control device, as set forth in claim 7, including a transmission control lever progressively manually movable between first and second positions, wherein the transmission is adapted to responsibly shift between a forward and a reverse gear ratio in response to movement of said control member from said first position to said second position, the control lever producing an operator transmission signal indicative the position of the control lever.

9. An electrohydraulic control device, as set forth in claim 8, wherein the control means receives the operator transmission control signal, and controllably actuates the braking electrohydraulic valve to slow the machine prior to a directional shift of the transmission.

10. An electrohydraulic control device, as set forth in claim 9, wherein the torque converter further includes a reactor element, a turbine element connected between the rotating housing and the turbine element, and a lockup clutch connected between the rotating housing and the turbine element, and including a lockup clutch electrohydraulic valve for directing fluid flow to the lockup clutch to engage and disengage the lockup clutch.

11. A method for controlling a drive train of a machine including an engine, a transmission, and a torque converter having a rotating housing and being drivingly connected between the engine and the transmission, wherein the torque converter includes an impeller element, an impeller clutch for connecting the impeller element to the rotating housing, and an impeller clutch electrohydraulic valve for producing fluid flow to the impeller clutch to controllably engage and disengage the impeller clutch, including the steps of:

sensing the output speed of the torque converter and responsively producing a torque converter speed signal; and receiving the measured torque converter speed signal, determining a desired torque convertor speed signal, producing an error speed signal in response to a difference between the measured and desired torque converter speed signals, and controllably actuating the electrohydraulic valve to cause the speed error signal to approach zero.

12. A method, as set forth in claim 11, wherein the machine includes a set of brakes and a braking electrohydraulic valve for producing fluid flow to the brake set to controllably engage and disengage the brake set, the method including the step of selectively controlling one of the impeller clutch and braking electrohydraulic valve to cause the speed error signal to approach zero.

13. A method, as set forth in claim 12, wherein the machine includes an impeller pedal being moveable between a minimum and maximum position, including the step of producing an operator impeller signal in response to the position of the impeller pedal.

14. A method, as set forth in claim 13, including the steps of receiving the operator impeller signal, modifying the measured torque converter signal in response to the operator impeller signal, producing a desired torque converter speed signal in response to the modified measured torque signal, and controllably actuating the electrohydraulic valve in response the desired torque converter speed signal.

* * * * *